US008977069B2

(12) United States Patent
Hwang et al.

(10) Patent No.: US 8,977,069 B2
(45) Date of Patent: Mar. 10, 2015

(54) METHOD AND APPARATUS OF OBTAINING HIGH RESOLUTION IMAGE USING MULTI-BAND COMBINATION FILTERS

(75) Inventors: Kyu Young Hwang, Suwon-si (KR); Ho Young Lee, Suwon-si (KR); Du-Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 855 days.

(21) Appl. No.: 12/662,366

(22) Filed: Apr. 13, 2010

(65) Prior Publication Data
US 2011/0018877 A1    Jan. 27, 2011

(30) Foreign Application Priority Data
Jul. 21, 2009   (KR) .................. 10-2009-0066215

(51) Int. Cl.
*G06K 9/40*   (2006.01)
*G06T 3/40*   (2006.01)
(52) U.S. Cl.
CPC .................................. *G06T 3/4061* (2013.01)
USPC ............ 382/260; 382/298; 382/299; 382/300
(58) Field of Classification Search
USPC .......................... 382/191, 298–300
See application file for complete search history.

(56) References Cited

U.S. PATENT DOCUMENTS 5,327,366 A * 7/1994 Mau .............................. 708/321
5,717,789 A * 2/1998 Anderson et al. ............. 382/254

FOREIGN PATENT DOCUMENTS

| JP | 2005-175997 | 6/2005 |
| KR | 10-2005-0002979 | 1/2005 |
| KR | 10-2009-0013522 | 2/2009 |
| KR | 10-2009-0032807 | 4/2009 |

* cited by examiner

*Primary Examiner* — Chan Park
*Assistant Examiner* — Mark Roz
(74) *Attorney, Agent, or Firm* — NSIP Law

(57) ABSTRACT

Provided are an apparatus and method of obtaining a high resolution image using multi-band combination filters. The apparatus includes a high frequency extraction unit to extract a high frequency image from a low resolution input image through filtering operations performed in parallel, a high frequency expansion unit to expand the high frequency image to generate an expanded high frequency image, an image expansion unit to expand the low resolution input image to generate an expanded input image, and an image combination unit to combine the expanded high frequency image and the expanded input image.

4 Claims, 4 Drawing Sheets

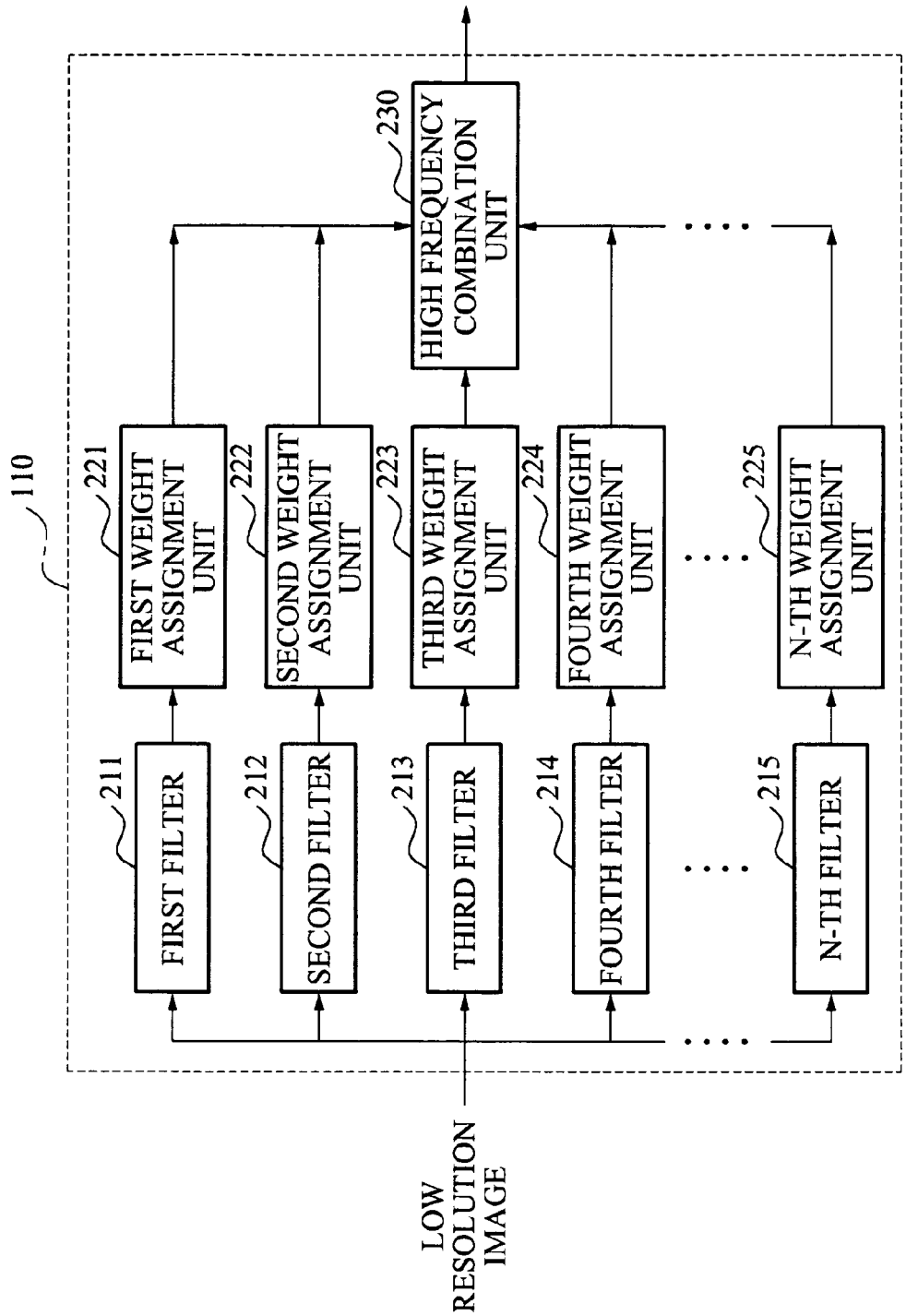

METHOD AND APPARATUS OF OBTAINING HIGH RESOLUTION IMAGE USING MULTI-BAND COMBINATION FILTERS

CROSS-REFERENCE TO RELATED APPLICATIONS

This application claims the priority benefit of a Korean Patent Application No. 10-2009-0066215, filed on Jul. 21, 2009, in the Korean Intellectual Property Office, the disclosure of which is incorporated herein by reference.

BACKGROUND

1. Field

Exemplary embodiments relate to a resolution improvement of various display devices, and more particularly, to an image resolution improvement apparatus that may overcome a blur phenomenon of a high frequency area of an image, and to a method of operating the same.

2. Description of the Related Art

In general, since realism and immersion for a viewer increases as display apparatuses become larger, display apparatuses, having a large size and a high-resolution, are being rapidly developed. In particular, a development in a plane panel TV such as a plasma display panel (PDP) and a liquid crystal display (LCD) may accelerate the above described development in display apparatuses. Nevertheless, a development in acquisition and generation of image content may not keep pace with the development of the display apparatuses. Thus, a resolution improvement of a low resolution to a high resolution or of the low resolution to an ultra high-resolution may need to be included. However, an existing linear interpolation-based scaler may have disadvantages in that a definition is deteriorated and a blur phenomenon is generated due to a failure in compensating for a shortage of high frequency elements.

To improve a resolution using a single input image, a resolution improvement may need to be performed while including as much information capable of being extracted from the input image as possible. A generally used ultra-high resolution improvement algorithm may be an Iterative Back Projection (IBP) algorithm.

The IBP algorithm may perform five operations. First, the IBP algorithm may convert an input image inputted in a low resolution into an initial high resolution image. Second, the IBP algorithm may reduce the high resolution image into a low resolution image having the same resolution as in the input image. Third, the IBP algorithm may calculate a difference between the input image and the reduced image to generate a differential image. Fourth, the IBP algorithm may expand the differential image into a high resolution, and generate a high resolution image in addition to a currently generated high resolution image. Fifth, the IBP algorithm may iteratively perform the second to fourth operations a predetermined number of times.

The above described iteration algorithm may generate the high resolution image having an improved definition by continuously updating information of the input image through an iteration operation. That is, the high resolution image may be corrected through an update operation using a difference between an image generated in the high resolution image and the input image, thereby generating the high resolution image having the improved definition.

That is, as the operation is iteratively performed, an updated differential image may correspond to a high frequency element obtained such that the low frequency element is gradually removed from the input image. The high frequency element in which the low frequency element is removed from the input image may be repeatedly updated in the high resolution image, thereby obtaining the high resolution image having the improved definition.

The iteration algorithm may be expressed as $$I_{t+1}^h = I_t^h + \text{EXPAND}(I^l - \text{REDUCE}(I_t^h)). \quad \text{[Equation 1]}$$

where $I^l$ denotes a low resolution-input image, $I^h$ denotes a high resolution image, t denotes an iteration, EXPAND( ) denotes a function expanding from the low resolution image to the high resolution image, and REDUCE( ) denotes a function reducing from the high resolution image to the low resolution image.

An element practically updated in Equation 1 may correspond to $I^l - \text{REDUCE}(I_t^h)$, and $\text{REDUCE}(I_t^h)$ may correspond to a low frequency element of the input image. Accordingly, the updated element may correspond to a high frequency element of the input image. That is, since the high frequency element of the input image is updated, a subsequent differential image may correspond to the high frequency element in which the low frequency element is more greatly removed from the input image in comparison with a preceding differential image. Also, the subsequent differential image may correspond to the high frequency element of which a magnitude is reduced.

SUMMARY

According to an aspect of exemplary embodiments, there is provided an apparatus for obtaining a high resolution image, the apparatus including: a high frequency extraction unit to extract a high frequency image from a low resolution input image through filtering operations performed in parallel; a high frequency expansion unit to expand the high frequency image to generate an expanded high frequency image; an image expansion unit to expand the low resolution input image to generate an expanded input image; and an image combination unit to combine the expanded high frequency image and the expanded input image, wherein the image combination unit may use at least one processor.

A high frequency extraction unit may include: a plurality of filters to filter the low resolution input image using a predetermined plurality of frequency bands to extract filtered images; a plurality of weight assignment units to assign a predetermined weight to each of the filtered images; and a high frequency combination unit to combine the filtered images to which the predetermined weight is assigned to generate the high frequency image.

Also, a plurality of filters may be high-pass filters which filter the low resolution input image using a predetermined high frequency band formed by the high pass filters.

Also, each of a plurality of filters may include: a low-pass filter to filter the low resolution input image; and a difference generation unit to calculate a difference between the low resolution input image and a low frequency band image filtered using the low-pass filter to obtain a differential image, and to output the differential image as the filtered image, wherein the plurality of filters form a predetermined low frequency band.

According to another aspect of exemplary embodiments, there is provided an apparatus for obtaining a high resolution image, the apparatus including: a plurality of filters to filter a low resolution input image using a predetermined plurality of frequency bands to extract filtered images; a plurality of weight assignment units to assign a predetermined weight to each of the filtered images; and a high frequency combination unit to combine the filtered images to which the predetermined weight is assigned to generate the high frequency image, wherein the high frequency combination unit may use at least one processor.

An apparatus for obtaining a high resolution image may further include: a high frequency expansion unit to expand the high frequency image to thereby generate an expanded high frequency image; an image expansion unit to expand the low resolution input image to thereby generate an expanded input image; and an image combination unit to combine the expanded high frequency image and the expanded input image, wherein the plurality of filters are high-pass filters, which have different bands from each other, to filter the low resolution input image using a predetermined high frequency band formed by the high pass filters, or the plurality of filters are difference generation units coupled to corresponding low pass filters, which have different bands from each other, to filter the low resolution input image using a predetermined low frequency band formed by the corresponding low pass filters.

Also, a plurality of filters may be high-pass filters which filter the low resolution input image using a predetermined high frequency band formed by the high pass filters.

Also, each of a plurality of filters may include: a low-pass filter to filter the low resolution input image; and a difference generation unit to calculate a difference between the low resolution input image and a low frequency band image filtered using the low-pass filter to obtain a differential image, and output the differential image as the filtered images, wherein the plurality of filters form a predetermined low frequency band.

According to yet another aspect of exemplary embodiments, there is provided a method for obtaining a high resolution image, the method including: receiving a low resolution input image; generating a high frequency image from the low resolution input image through filtering operations performed in parallel; expanding the high frequency image to generate an expanded high frequency image; expanding the low resolution input image to generate an expanded input image; and combining the expanded high frequency image and the expanded input image, wherein the method may be performed using at least one processor.

A generating of the high frequency image may include: filtering the low resolution input image using a plurality of frequency bands to extract filtered images; assigning a predetermined weight to each of the filtered images; and combining the filtered images to which the predetermined weight is assigned.

According to further aspect of exemplary embodiments, there is provided a method for obtaining a high resolution image, the method including: receiving a low resolution input image; filtering the low resolution input image using a predetermined plurality of frequency bands to extract filtered images; assigning a predetermined weight to each of the filtered images; and combining the filtered images to which the predetermined weight is assigned to generate a high frequency image to obtain the high resolution image, wherein the method may be performed using at least one processor.

A method may further include: expanding the high frequency image to generate an expanded high frequency image; expanding the low resolution input image to generate an expanded input image; and combining the expanded high frequency image and the expanded input image, wherein the plurality of predetermined frequency bands is a plurality of predetermined high pass frequency bands or the plurality of frequency bands is a plurality of predetermined low pass frequency bands.

According to another aspect of exemplary embodiments, there is provided at least one computer readable medium storing computer readable instructions to implement methods of the disclosure.

BRIEF DESCRIPTION OF THE DRAWINGS

These and/or other aspects will become apparent and more readily appreciated from the following description of exemplary embodiments, taken in conjunction with the accompanying drawings of which:

FIG. 2 illustrates a configuration of a high frequency extraction unit of the apparatus for obtaining a high resolution image of FIG. 1;

DETAILED DESCRIPTION

Figure 1:
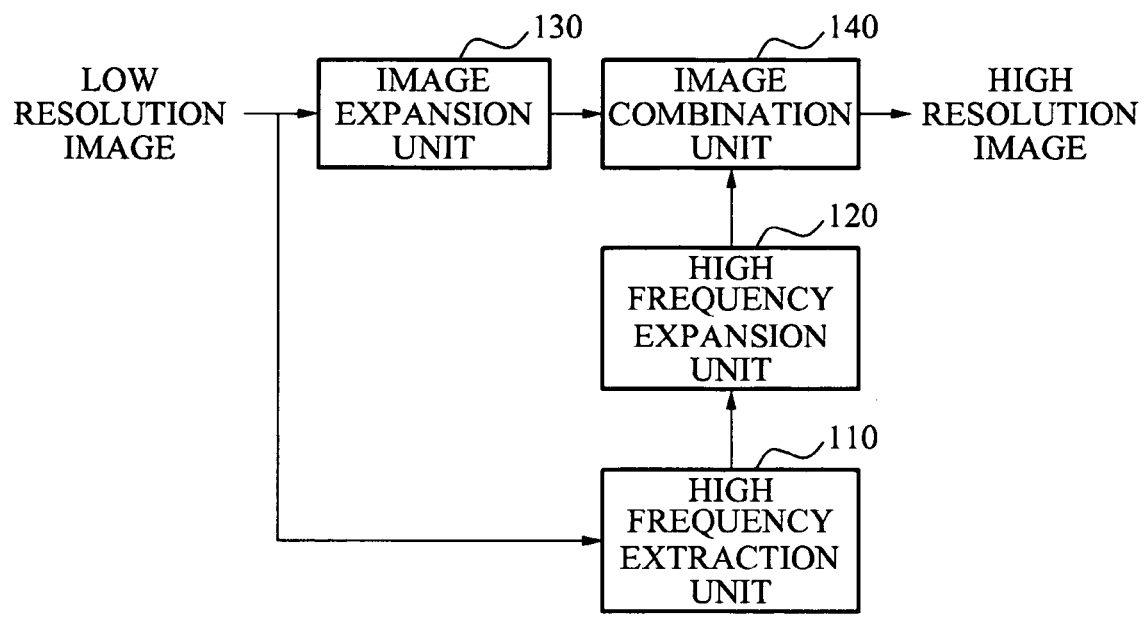
FIG. 1 illustrates a configuration of an apparatus for obtaining a high resolution image according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

Exemplary embodiments relate to an apparatus and a method that may obtain a high resolution image using a filter group, and that may restore an ultra high resolution image to be used in a display apparatus capable of displaying the ultra high resolution image such as a High Definition television (HDTV), an Ultra Definition TV (UDTV), and the like.

FIG. 1 illustrates a configuration of an apparatus for obtaining a high resolution image according to exemplary embodiments. Referring to FIG. 1, the apparatus according to exemplary embodiments includes a high frequency extraction unit 110, a high frequency expansion unit 120, an image expansion unit 130, and an image combination unit 140.

The high frequency extraction unit 110 may generate a high frequency image from a low resolution input image through filtering operations performed in parallel. The high frequency extraction unit 110 may update a plurality of high resolution images in parallel using a frequency characteristic corresponding to a differential image generated when an iteration operation is performed, instead of updating the high resolution images through the iteration operation.

The high frequency expansion unit 120 may expand the high frequency image to generate an expanded high frequency image. The image expansion unit 130 may expand a low resolution input image to generate an expanded input image. The image combination unit 140 may combine the expanded high frequency image and the expanded input image to generate the high resolution image.

FIG. 2 illustrates a configuration of the high frequency extraction unit 110 of the apparatus for obtaining a high resolution image according to exemplary embodiments of FIG. 1. Referring to FIG. 2, the high frequency extraction unit 110 includes a plurality of filters 211, 212, 213, 214, and 215, a plurality of weight assignment units 221, 222, 223, 224, and 225 and a high frequency combination unit 230.

The plurality of filters 211, 212, 213, 214, and 215 may filter the low resolution input image using a predetermined plurality of frequency bands to extract filtered images. In this instance, the plurality of frequency bands filtered by the filters may be frequency bands indicating a visually sensitive part to a human, which is confirmed empirically.

Figure 3A:
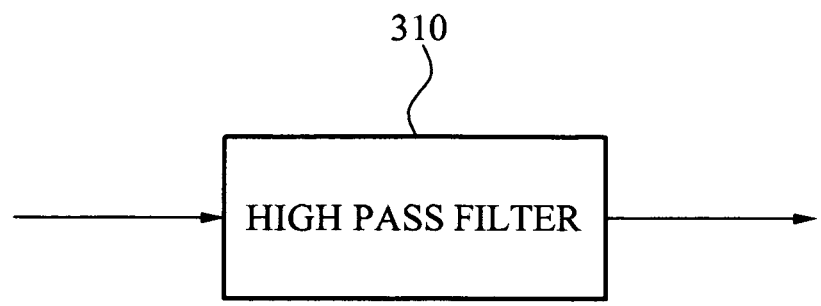
FIG. 3A illustrates an example of a filter included in the high frequency extraction unit of FIG. 1.
Figure 3B:
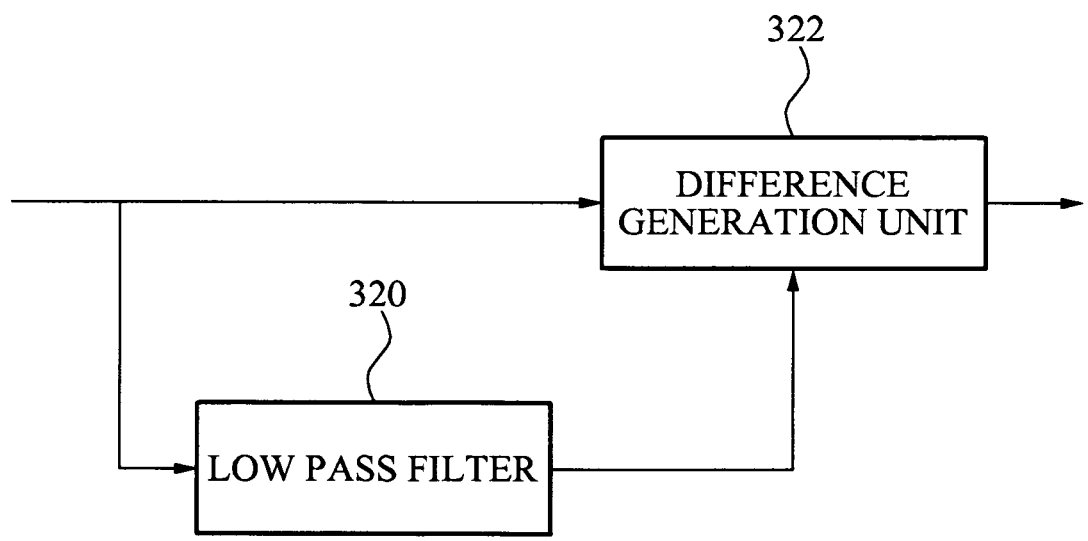
FIG. 3B illustrates another example of a filter included in the high frequency extraction unit of FIG. 1.

The plurality of filters 211, 212, 213, 214, and 215 may be configured as shown in FIGS. 3A and 3B. FIGS. 3A and 3B illustrate examples of a filter included in the high frequency extraction unit 110 of FIG. 1.

The plurality of filters 211, 212, 213, 214, and 215 may be configured with a plurality of high pass filters 310 as in FIG. 3A, which have different bands from each other, and filter the low resolution input image using a predetermined high frequency band.

As another example, the plurality of filters 211, 212, 213, 214, and 215 may be configured with a plurality of low pass filters 320 as in FIG. 3B, which have different bands from each other, and a difference generation unit 322. In this example, the plurality of low pass filters 320 may filter the low resolution input image using a predetermined low frequency band.

The difference generation unit may calculate a difference between the low resolution input image and the low frequency band image filtered by the low pass filters 320 to obtain a differential image, and output the differential image to a filtered image.

The plurality of weight units 221, 222, 223, 224, and 225 may assign a predetermined weight to each of the filtered images. In this example, the weight may have a higher weight value as the filtered frequency band is more visually sensitive to a human, and may be determined empirically.

The high frequency combination unit 230 may combine the filtered images to which the weight is assigned to generate the high frequency image.

Hereinafter, a method for obtaining a high resolution image using multi-band combination filters including a plurality of filters in the apparatus for obtaining the high resolution image configured as described above will be described in detail with reference to FIG. 4.

Figure 4:
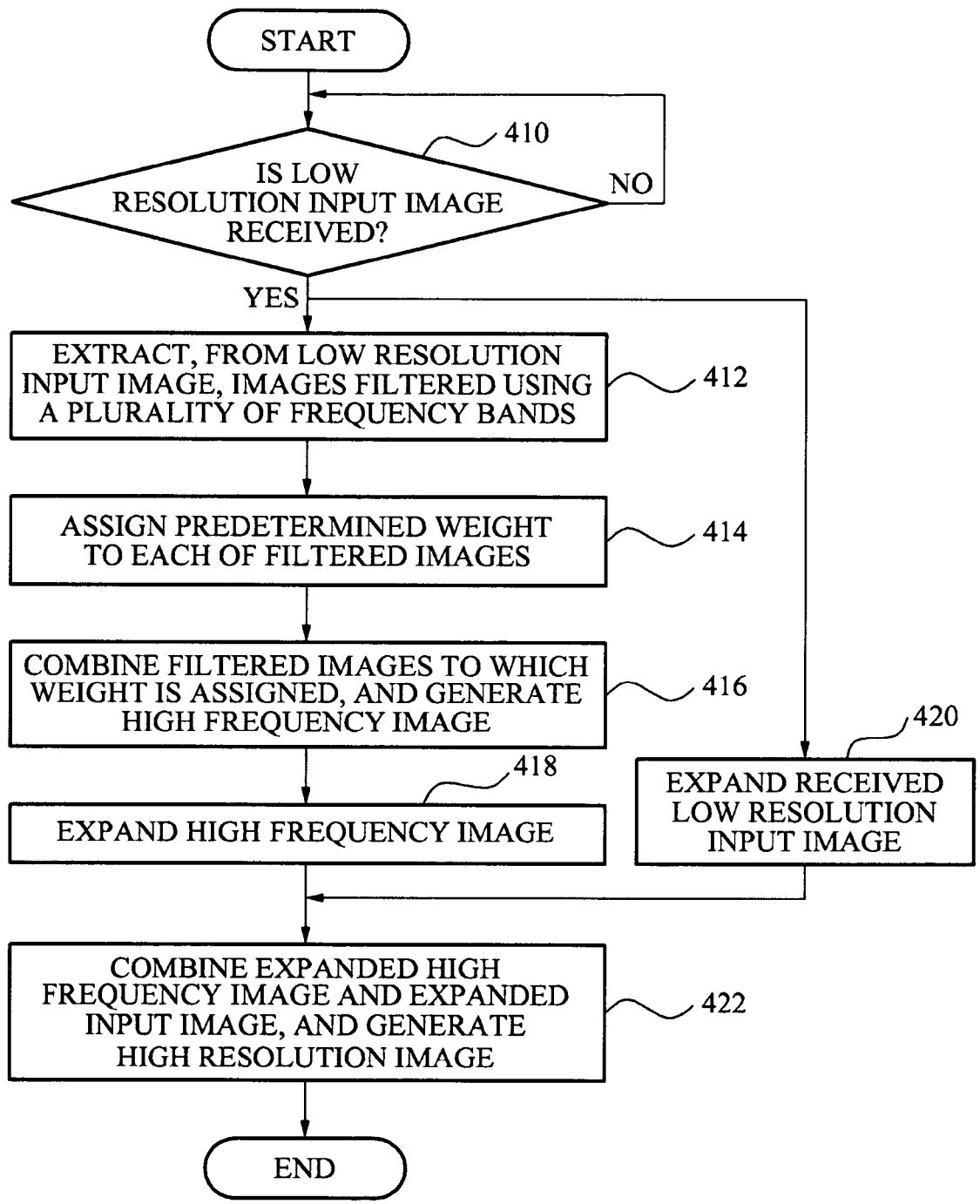
FIG. 4 is a flowchart illustrating a method for obtaining a high resolution image according to exemplary embodiments.

FIG. 4 is a flowchart illustrating a method of obtaining a high resolution image according to exemplary embodiments. Referring to FIG. 4, when receiving a low resolution input image in operation 410, the method may proceed to operation 412, and extract, from the low resolution input image, images filtered using a plurality of frequency bands.

In operation 414, the apparatus may assign a predetermined weight to each of the filtered images, and in operation 416, combine the filtered images to which the predetermined weight is assigned to generate a high frequency image.

In operation 418, the apparatus may expand the high frequency image to generate an expansion high frequency image. In operation 420, the apparatus may expand the low resolution input image to generate an expanded input image.

In operation 422, the apparatus may combine the expanded high frequency image and the expanded input image to generate a high resolution image.

As described above, according to exemplary embodiments, there is provided an apparatus for obtaining a high resolution image, the apparatus including a high frequency extraction unit to extract a high frequency image from a low resolution input image through filtering operations performed in parallel, a high frequency expansion unit to expand the high frequency image to generate an expanded high frequency image, an image expansion unit to expand the low resolution input image to generate an expanded input image, and an image combination unit to combine the expanded high frequency image and the expanded input image. Accordingly, an operation being iteratively performed may be approximated through filtering operations performed in parallel without extracting the high frequency image through the iteration operation in the high frequency extraction unit, thereby reducing a time required for the operation being iteratively performed.

The above described methods may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. An apparatus for obtaining a high resolution image, the apparatus comprising:
 a processor comprising:
  a high frequency extraction unit to extract a high frequency image from a low resolution input image through filtering operations performed in parallel wherein the high frequency extraction unit comprises a plurality of filters to filter the low resolution input image using a predetermined plurality of frequency bands, which are different bands from each other, to extract filtered images;
  a high frequency expansion unit to expand the high frequency image to generate an expanded high frequency image;
  an image expansion unit to expand the low resolution input image to generate an expanded input image; and
  an image combination unit to combine the expanded high frequency image and the expanded input image,
  wherein the predetermined plurality of frequency bands indicate a visually sensitive part to a human, and
  wherein the high frequency extraction unit further comprises:
   a plurality of weight assignment units to assign a predetermined weight to each of the filtered images, wherein each predetermined weight has a weight value which increases as the frequency bands used for filtering images become more visually sensitive to the human; and a high frequency combination unit to combine the filtered images to which the predetermined weight is assigned to generate the high frequency image, and wherein the high frequency extraction unit, the image expansion unit, the image combination unit, the plurality of weight assignment units, and the high frequency combination unit use at least one processor.

2. The apparatus of claim 1, wherein the plurality of filters are high-pass filters which filter the low resolution input image using a predetermined high frequency band formed by the high-pass filters.

3. The apparatus of claim 1, wherein each of the plurality of filters includes:

a low-pass filter to filter the low resolution input image; and a difference generation unit, using at least one processor, to calculate a difference between the low resolution input image and a low frequency band image filtered using the low-pass filter to obtain a differential image, and to output the differential image as the filtered image, wherein the plurality of filters form a predetermined low frequency band.

4. A method for obtaining a high resolution image, the method comprising:

receiving a low resolution input image;

generating a high frequency image from the low resolution input image through filtering operations performed in parallel, wherein the generating of the high frequency image filtering the low resolution input image using a plurality of frequency bands, which have different bands from each other, to extract filtered images;

expanding the high frequency image to generate an expanded high frequency image;

expanding the low resolution input image to generate an expanded input image; and combining the expanded high frequency image and the expanded input image, wherein the predetermined plurality of frequency bands indicate a visually sensitive part to a human, wherein the method is performed using at least one processor, wherein the generating of the high frequency image further comprises:

assigning a predetermined weight to each of the filtered images; and combining the filtered images to which the predetermined weight is assigned, and wherein each predetermined weight has a weight value which increases as the frequency bands used for filtering images become more visually sensitive to the human.

* * * * *